United States Patent [19]

Lange

[11] 4,143,851

[45] Mar. 13, 1979

[54] GAS-OIL DRIVE FOR FORWARD AND REVERSE MECHANICAL ADJUSTING MOVEMENTS

[75] Inventor: Bernd Lange, Berlin, Fed. Rep. of Germany

[73] Assignee: Borsig Gesellschaft mit beschrankter Haftung, Berlin, Fed. Rep. of Germany

[21] Appl. No.: 847,587

[22] Filed: Nov. 1, 1977

[30] Foreign Application Priority Data

Nov. 3, 1976 [DE] Fed. Rep. of Germany ....... 2650802

[51] Int. Cl.2 .............................................. F16K 31/42

[52] U.S. Cl. ....................................... 251/29; 251/30; 60/416

[58] Field of Search ....................... 251/30, 31, 28, 29; 60/415, 416

[56] References Cited

U.S. PATENT DOCUMENTS 2,290,479 7/1942 Mercier ................................ 60/416

2,738,945 3/1956 Shafer ................................ 251/29 X

*Primary Examiner*—Arnold Rosenthal

*Attorney, Agent, or Firm*—Walter Becker

[57] ABSTRACT

A gas-oil drive for forward and reverse mechanical adjusting movements. Gas, which is available for every direction of movement of an adjusting drive at a pressure greater than atmospheric pressure, conveys its pressure in a pressure tank to control oil which flows to an adjusting device for carrying out a control operation. For both oppositely directed adjusting movements of the gas-oil drive, a single pressure tank for delivering control oil under pressure to the respective corresponding position of the adjusting device, and a single unpressurized container for receiving expelled, unpressurized control oil are provided. The unpressurized container is located above the level of the pressure tank, and a bore on the unpressurized container is connected with a bore on the pressure tank by means of a control oil line in which is located a check valve which closes in a direction of flow toward the unpressurized container.

9 Claims, 1 Drawing Figure

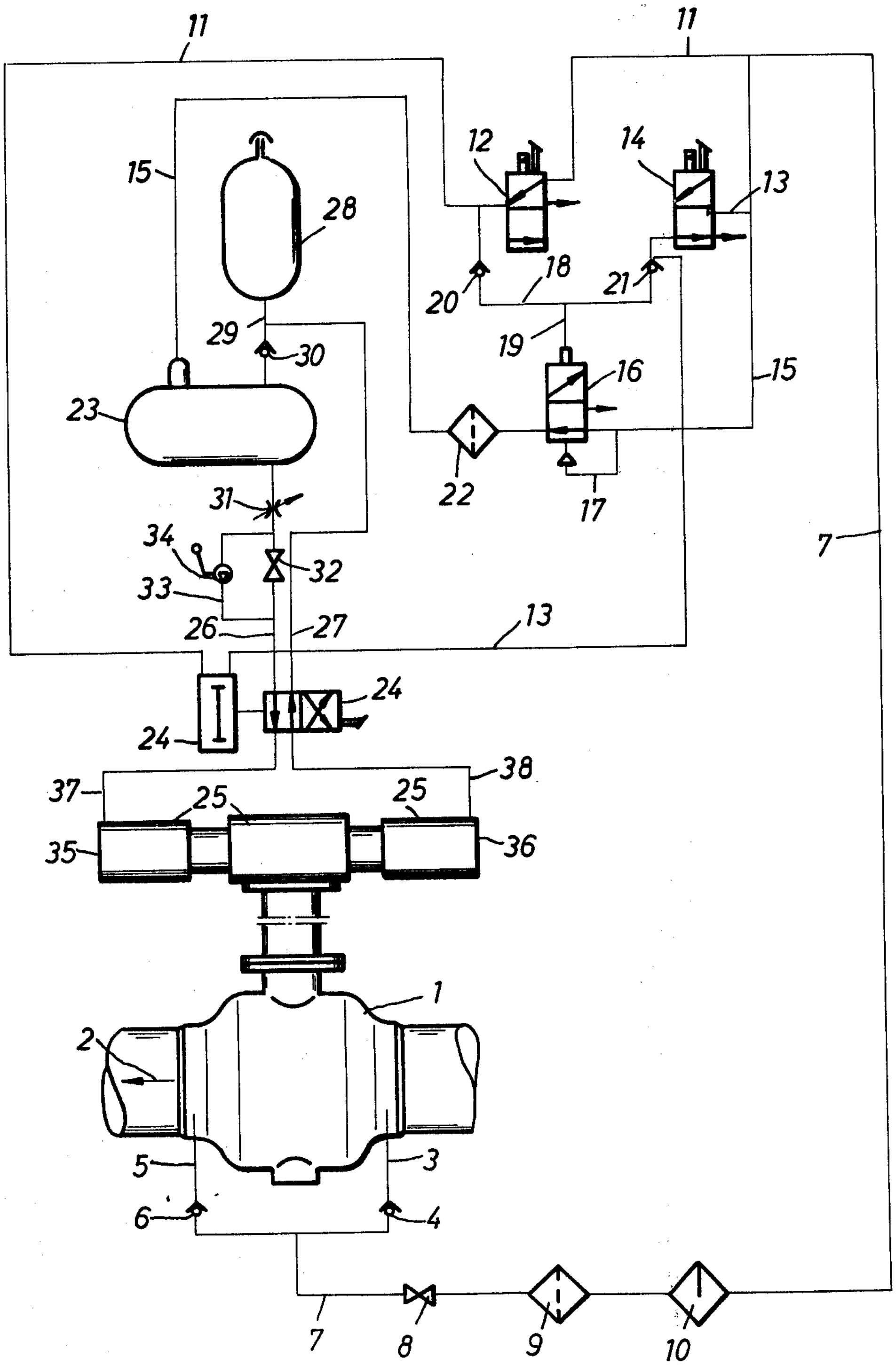
11
11
12
14
13
15
28
18
20
21
29
19
16
30
15
23
22
17
31
34
32
7
33
26
27
13
24
24
37
25
38
25
35
36
1
2
5
3
6
4
7
8
9
10

GAS-OIL DRIVE FOR FORWARD AND REVERSE MECHANICAL ADJUSTING MOVEMENTS

The present invention relates to a gas-oil drive for forward and reverse mechanical adjusting movements. Gas, which is available for every direction of movement of an adjusting drive at a pressure greater than atmospheric pressure, conveys its pressure in a pressure tank to control oil which flows to an adjusting device for carrying out a control operation.

With such gas-oil drives, for every control operation, i.e., for the forward and reverse adjusting movements, such a volume of control oil which is under pressure must be kept available that the required control operation can be completely and reliably carried out.

It is known to fulfill this requirement by providing gas-oil drives as piston drives for ball valves, according to which pressure tanks for control oil are respectively provided for opening and for closing the ball-shaped stop cock. In this connection, each of the two pressure tanks, which contain control oil at the bottom and, above that, compressed gas, has a capacity of at least three times the sum of the displacements of both pistons of the adjusting device, with the control oil quantity required for effecting adjusting movements equalling the volume of a single pressure tank. In addition, a level compensating valve is located in a connecting line between the two pressure tanks (Technical Documentation Piston Drives for Ball Valves superbloc, Type D, E, F of Borsig GmbH, 30 July 1976, pages 26 and 35). With adjusting drives which must furnish high torques at low gas or control oil pressures, the two pressure tanks must therefore be very large and are expensive to manufacture, and a large amount of control oil must be available.

It is an object of the present invention to equip a gas-oil drive with only one pressure tank, which has a capacity of about one third the capacity of the heretofore known pressure tanks, in connection with which the control oil quantity amounts to only approximately two thirds the usual amount.

This object and other objects and advantages of the present invention will appear more clearly from the following specification in connection with the accompanying drawing, which is a schematic illustration of a gas-oil drive assembly as an adjusting drive for a stop cock of a ball valve in a natural gas conduit.

The gas-oil drive of the present invention is characterized primarily in that for both oppositely directed adjusting movements of the gas-oil drive, a single pressure tank for delivering control oil under pressure to the respective corresponding position of the adjusting device, and a single unpressurized container for receiving expelled, unpressurized control oil are arranged in such a way that the unpressurized container is located above the level of the pressure tank, and a bore on the unpressurized container is connected with a bore on the pressure tank by means of a control line in which is located a check valve which closes in a direction of flow toward the unpressurized container.

If the gas-oil drive is to be used for controlling a ball-shaped stop cock of a ball valve in a natural gas line, then, pursuant to a further embodiment of the present invention, the gas which is under pressure is, for example, natural gas which flows from a conduit in which is located, for example, a ball valve as a conduit control. The adjusting device of the ball valve is acted upon by control oil and, to control the stop cock of the ball valve, has one or more cylinders with single or double acting reciprocating pistons for opening and closing the stop cock.

In order to guarantee that, from the same pressure tank, one or the other cylinder side of the adjusting device receives control oil under pressure, and, at the same time, unpressurized control oil can flow out of one or both cylinders into the same unpressurized container, it is further proposed pursuant to the present invention, between the pressure tank and the unpressurized container, on the one hand, and the adjusting device on the other hand, to provide a pneumatic reversing valve, to the pneumatic mechanism of which natural gas pulse lines lead.

An automatic operation of the gas-oil drive is effected pursuant to the present invention by controlling the stop cock in the ball valve with the aid of a remote controlled solenoid valve and its natural gas pulse line to the pneumatic reversing valve for opening the stop cock, with the aid of another remote controlled solenoid valve and its natural gas pulse line to the reversing valve for closing the stop cock, and with the aid of a pneumatic valve with a natural gas pulse line to the pressure tank. In this connection, the pneumatic mechanism of the pneumatic valve is connected with both solenoid valves by a branch line and a natural gas pulse line, and the two natural gas pulse lines from the two solenoid valves to the pneumatic reversing valve are secured against accidental flowing-in of natural gas by means of respective check valves located in that natural gas pulse line which connects the solenoid valves.

Pursuant to yet another specific embodiment of the present invention, during failure of the automatic mechanism for the gas-oil drive, control of the stop cock in the ball valve is effected by closing the ball valve in the control oil line and controlling the pneumatic reversing valve by hand with the aid of a control oil hand pump in a control oil bypass line around a ball valve located in a control oil line between the pressure tank and the pneumatic reversing valve.

The advantage achieved with the present invention consist particularly in that, instead of two expensive pressure tanks each having a capacity of at least three times the sum of the displacements of the reciprocating pistons, and instead of the adjusting device and a level compensating valve between both pressure tanks, what is required is only one pressure tank and one continually unpressurized simple container, each having a capacity of at least the simple displacement sum of the reciprocating pistons of the adjusting device, thus requiring a control oil quantity which corresponds to only about two thirds of the usual amount of oil.

Referring now to the drawing in detail, as viewed in the direction of flow 2 of the natural gas, on the ball valve 1, before the now shown stop cock, is a natural gas pulse line 3 with a check valve 4 which closes in a direction of flow toward the ball valve 1 and, behind the stop cock, is a natural gas pulse line 5 with a check valve 6 which closes in a direction of flow toward the ball valve 1.

Both natural gas pulse lines 3,5 join to form the natural gas pulse line 7, which, in a direction of flow away from the ball valve 1, successively has a shutoff ball valve for separating the actual gas-oil drive from the natural gas passage through the ball valve 1, a filter 9 for trapping impurities in the natural gas, and a molecular filter 10 for absorbing moisture from the natural gas.

After the molecular filter 10, the natural gas pulse line 7 branches off into the natural gas pulse lines 11, 13 and 15. Natural gas pulse line 11 leads to the remote controlled solenoid valve 12 which is responsible for opening the stop cock; the natural gas pulse line 13 leads to the remote controlled solenois valve 14 which is responsible for closing the stop cock; and the natural gas pulse line 15 leads to the pneumatic valve 16, the closure element of which is pneumatically reset by a natural gas pulse line 17. Both solenoid valves 12, 14 are connected to one another by the natural gas pulse line 18, which, by means of the branch line 19, leads to the pneumatic mechanism of the pneumatic valve 16. On both sides of the branch line 19, in the natural gas pulse line 18, are located check valves 20 and 21 which respectively close in a direction of flow toward the solenoid valves 12 and 14 respectively. The natural gas pulse line 15, through the pneumatic valve 16, leads through a further filter 22 and empties into the pressure tank 33, which contains control oil. The natural gas pulse line 11, through the solenoid valve 12, ends on one side of the pneumatic mechanism of the pneumatic reversing valve 24, and the natural gas pulse line 13, through the solenoid valve 14, ends on that side of the pneumatic mechanism of the pneumatic reversing valve 24 which operates opposite to the first side. At the same time as the operation of the adjusting drive, control oil under pressure is conveyed out of the pressure tank 23 to the adjusting device 25 of the ball valve 1 through the control oil line 26 and the pneumatic reversing valve 24, and unpressurized control oil is drawn off from the adjusting device 25 through the reversing valve 24 and a control oil line 25 and is supplied to the container 28 which is connected with the atmosphere, i.e., does not have an overpressure. The container 28 lies at a level above the pressure tank 23, so that with a drop in, or elimination of, the overpressure in the pressure tank 23, the control oil present in the container 28 can flow into the pressure tank 23 through the control oil line 29 which connects the container 28 with the pressure tank 23.

Since the flowing in of natural gas under pressure from the pressure tank 23 into the unpressurized container 28 must be prevented under all circumstances, the control oil line 29 is provided with the check valve 30 which closes in a direction of flow toward the container 28. An adjustable throttle or butterfly valve 31 is provided in the control oil line 26 for adjusting the regulating speed of the adjusting device 25; the control oil line 26 is further provided with the ball valve 32 and with the control oil diversion or bypass line 33 around the ball valve 32; and the control oil bypass line 33 is provided with the control oil hand pump 34. In this connection, in case of a disruption in the automatic adjusting driving device, in order to actuate the adjusting device 25, the pneumatic reversing valve 24 is adjusted by hand, the ball valve 32 is closed, and the control oil hand pump 34 is actuated. The adjusting device 25 is provided with cylinder 35, which has a reciprocating piston for opening the stop cock, and is further provided with cylinder 36, which has a reciprocating piston for closing the stop cock, both reciprocating pistons being rigidly coupled to one another. The connections between the pneumatic reversing valve 24 and the adjusting device 25 are produced by a control oil line 37 to the cylinder 35, and by a control oil line 38 to the cylinder 36. As a result, for opening the stop cock, control oil under pressure passes through the control oil line 26 and reversing valve 24, and the control oil line 37 into the cylinder 35, and, at the same time, unpressurized control oil flows out of the cylinder 36 through the control oil line 38, the reversing valve 24, and the control oil line 27 into the container 28. To close the stop cock after a reversal of the reversing valve 24, the control oil line 26 is connected to the line 38, and the control oil line 37 is connected to the line 27. After the termination of every control operation of the stop cock, i.e., after the opening or closing, the lines past the solenoid valves 12, 14 and the valve 16, and thereby the pressure tank 23, are automatically unpressurized.

A control operation will now be explained in connection with the drawing: Assume that the ball valve 1 is in the closed position and is to be opened. The shutoff ball valve 8 is opened; the solenoid valves 12, 14 and the pneumatic valve 16 are closed. The natural gas pressure in front of the stop cock builds up through the natural gas pulse lines 3,7 up to the closed valves. By remote control, the solenoid valve 12 is opened as shown in the drawing, so that the natural gas behind the solenoid valve 12 on the one hand passes through the natural gas pulse line 11 to the pneumatic reversing valve 24, bringing the latter into the position shown in the drawing, and on the other hand, through the natural gas pulse line 18, the check valve 20, and the branch line 19, actuates the pneumatic mechanism of the pneumatic valve 16 to open the latter. As a result, the natural gas, through the pulse line 15, raises the pressure of the pressure tank 23, and thereby the control oil contained therein, to a pressure greater than atmospheric pressure. Control oil now flows out of the pressure tank 23 through the control oil line 25, the reversing valve 24, and the control oil line 37 into the cylinder 35, displacing the piston located therein. As a result, the stop cock of the ball valve 1 is opened. At the same time, unpressurized control oil is conveyed out of the cylinder 36, with the aid of the piston moved therein, through the control oil line 38, the reversing valve 24, and the control oil line 27 into the unpressurized container 28. After terminating this control operation, the pressure tank 23 automatically becomes unpressurized, and the control oil contained in the container 28 can flow through the control oil line 29 and the check valve 30 into the pressure tank 23.

It is, of course, to be understood that the present invention is by no means limited to the specific showing in the drawing, but also encompasses any modifications within the scope of the appended claims.

What I claim is:

1. Gas-oil drive for forward and reverse adjusting movements for controlling valve means, located in a gas conduit for controlling the flow of said gas therethrough, which comprises: a pressure tank associated with said gas-oil drive and adapted to receive control oil; means for conveying gas from said gas conduit at a pressure greater than atmospheric pressure to said pressure tank so as to convey said gas pressure to control oil contained in said pressure tank; an adjusting device, connected to said pressure tank and adapted to receive therefrom control oil under pressure, for effecting the control of said valve means in said gas conduit, said adjusting device also being adapted to expel control oil; and an unpressurized container connected to said adjusting device and said pressure tank for receiving oil, expelled by said adjusting device at atmospheric pressure, said container being located above the level of said pressure tank.

2. A gas-oil drive according to claim 1, in which said connection between said pressure tank and said unpressurized container comprises a control oil line and a first check valve which is located in said control oil line and is designed to close in a direction of flow toward said unpressurized container.

3. A gas-oil drive according to claim 1, in which said adjusting device comprises at least one cylinder having single acting reciprocating pistons.

4. A gas-oil drive according to claim 1, in which said adjusting device comprises at least one cylinder having at least one double acting reciprocating piston.

5. A gas-oil drive according to claim 1, in which said gas is natural gas.

6. A gas-oil drive according to claim 1, in which said valve means is a first ball valve.

7. A gas-oil drive according to claim 1, which includes a pneumatic reversing valve which has a pneumatic mechanism and is located in said connection between said pressure tank and said adjusting device and in said connection between said unpressurized container and said adjusting device.

8. A gas-oil drive according to claim 7, in which said means for conveying gas from said gas conduit comprises a first remote controlled solenoid valve connected to said reversing valve for opening said valve means, a second remote controlled solenoid valve connected to said reversing valve for closing said valve means, and a pneumatic valve having a pneumatic mechanism connected to said pressure tank and to both of said solenoid valves, second and third check valves being located in said connection between said solenoid valves and said pneumatic valve, said second and third check valves being designed to respectively close in a direction of flow toward said first and said second remote controlled solenoid valve respectively for preventing accidental flow of gas to said reversing valve.

9. A gas-oil drive according to claim 7, in which said reversing valve is manually operable, and which includes a second ball valve adapted to be opened and closed and located in said connection between said pressure tank and said reversing valve, a bypass line around said second ball valve, and a control oil hand pump located in said bypass line for controlling said adjusting device when said second ball valve is in a closed position.

* * * * *